000
United States Patent
Trout et al.

(10) Patent No.: US 6,743,458 B2
(45) Date of Patent: *Jun. 1, 2004

(54) REDUCED FAT LIPID-BASED FILLINGS

(75) Inventors: James Earl Trout, West Chester, OH (US); Dennis Paul Kirkpatrick, Cincinnati, OH (US)

(73) Assignee: The Procter + Gamble Co., Cincinnati, OH (US)

( * ) Notice: Subject to any disclaimer, the term of this patent is extended or adjusted under 35 U.S.C. 154(b) by 227 days.

This patent is subject to a terminal disclaimer.

(21) Appl. No.: 09/982,745

(22) Filed: Oct. 18, 2001

(65) Prior Publication Data

US 2002/0071898 A1 Jun. 13, 2002

Related U.S. Application Data

(60) Provisional application No. 60/242,609, filed on Oct. 23, 2000.

(51) Int. Cl.$^7$ .......................... A23C 19/09; A23D 9/007
(52) U.S. Cl. .......................... 426/582; 426/94; 426/607
(58) Field of Search .................. 426/582, 601, 426/607, 94, 275, 606

(56) References Cited

U.S. PATENT DOCUMENTS

| | | |
|---|---|---|
| 1,395,934 A | 11/1921 | Stockton |
| 2,504,620 A | 4/1950 | Avera |
| 2,521,243 A | 9/1950 | Mitchell |
| 2,552,925 A | 5/1951 | Avera |
| 2,562,630 A | 7/1951 | Mitchell |
| 2,962,419 A | 11/1960 | Minich |
| 3,085,939 A | 4/1963 | Wruble et al. |
| 3,192,102 A | 6/1965 | Nolan |
| 3,265,507 A | 8/1966 | Japikse |
| 3,541,009 A | 11/1970 | Arendt et al. |
| 3,579,548 A | 5/1971 | Whyte |
| 3,597,230 A | 8/1971 | Colby et al. |
| 3,600,186 A | 8/1971 | Mattson et al. |
| 3,615,675 A | 10/1971 | Wisdom et al. |
| 3,751,569 A | 8/1973 | Erickson |
| 3,865,939 A | 2/1975 | Jandacek |
| 3,917,863 A | 11/1975 | Kaufman, Jr. et al. |
| 3,932,532 A | 1/1976 | Hunter et al. |
| 4,005,195 A | 1/1977 | Jandacek |
| 4,005,196 A | 1/1977 | Jandacek et al. |
| 4,251,201 A | 2/1981 | Krysiak |
| 4,259,051 A | 3/1981 | Shatila |
| 4,275,647 A | 6/1981 | Chambers et al. |
| 4,341,814 A | 7/1982 | McCoy |
| 4,374,438 A | 2/1983 | Crowley |
| 4,482,575 A | 11/1984 | Olds |
| 4,508,746 A | 4/1985 | Hamm |
| 4,582,927 A | 4/1986 | Fulcher |
| 4,587,128 A | 5/1986 | Cummings |
| 4,661,360 A | 4/1987 | Smith |
| 4,774,095 A | 9/1988 | Kleinschmidt et al. |
| 4,794,009 A | 12/1988 | Dreisin |
| 4,808,422 A | 2/1989 | Ward et al. |
| 4,840,815 A | 6/1989 | Meyer et al. |
| 4,861,613 A | 8/1989 | White et al. |
| 4,863,753 A | 9/1989 | Hunter et al. |
| 4,865,859 A | 9/1989 | Porcello et al. |
| 4,880,653 A | 11/1989 | Keller et al. |
| 4,882,185 A | 11/1989 | Simelunas et al. |
| 4,888,195 A | 12/1989 | Huhn et al. |
| 4,959,466 A | 9/1990 | White |
| 5,041,541 A | 8/1991 | Mazur |
| 5,059,443 A | 10/1991 | Ennis et al. |
| 5,071,669 A | 12/1991 | Seiden |
| 5,077,073 A | 12/1991 | Ennis et al. |
| 5,079,027 A | 1/1992 | Wong et al. |
| 5,085,884 A | 2/1992 | Young et al. |
| 5,139,807 A | 8/1992 | Klemann et al. |
| 5,158,796 A | 10/1992 | Bernhardt et al. |
| 5,194,281 A | 3/1993 | Johnston et al. |
| 5,230,919 A | 7/1993 | Walling et al. |
| 5,244,887 A | 9/1993 | Straub |
| 5,268,192 A | 12/1993 | Zook et al. |
| 5,273,772 A | 12/1993 | Cooper |
| 5,288,512 A | 2/1994 | Seiden |
| 5,308,634 A | 5/1994 | Cooper |
| 5,374,438 A | 12/1994 | Yost |
| 5,374,446 A | 12/1994 | Ferenz et al. |

(List continued on next page.)

FOREIGN PATENT DOCUMENTS

| | | |
|---|---|---|
| WO | WO 98/41099 A1 | 9/1998 |
| WO | WO 01/72146 A2 | 10/2001 |

OTHER PUBLICATIONS

Banwart, G. J. 1981. Basic Food Microbiology, AVI Publishing Co., Inc. Westport, CT, p. 78–83.*

(List continued on next page.)

*Primary Examiner*—Carolyn Paden
(74) *Attorney, Agent, or Firm*—Melody A. Jones

(57) ABSTRACT

Creamy, reduced fat, low-moisture lipid-based fillings. The fillings comprise: (a) at least about 20% non-digestible lipid; and (b) from about 0.5% to about 35% crystallizing lipid. The fillings can additionally comprise other suitable optional ingredients. The filling has a water activity of less than about 0.6 and has at least about 20% less digestible fat than a comparable full-fat lipid-based filling. In one embodiment, a cheese filling comprises: (a) from about 20% to about 60% non-digestible lipid; (b) from about 0.5% to about 35% crystallizing lipid; (c) from about 20% to about 75% dehydrated cheese powder; and (d) from about 0% to about 55% bulking agent. The fillings can be used with any suitable substrate, but are especially suitable for use in random packed food products, especially sandwich biscuits. Sandwich biscuits made with the fillings adhere well to the biscuits so that the sandwich biscuits are not misaligned, smeared, or subject to splitting or decapping in production or after storage.

4 Claims, No Drawings

U.S. PATENT DOCUMENTS

| | | |
|---|---|---|
| 5,389,392 A | 2/1995 | Cooper |
| 5,399,371 A | 3/1995 | Harris |
| 5,399,729 A | 3/1995 | Cooper et al. |
| 5,419,925 A | 5/1995 | Seiden et al. |
| 5,422,131 A | 6/1995 | Elsen et al. |
| 5,427,815 A | 6/1995 | Ferenz |
| 5,433,970 A | 7/1995 | Wong et al. |
| 5,451,416 A | 9/1995 | Johnston et al. |
| 5,480,667 A | 1/1996 | Corrigan et al. |
| 5,490,995 A | 2/1996 | Corrigan |
| 5,490,999 A | 2/1996 | Villagran et al. |
| 5,502,045 A | 3/1996 | Miettinen et al. |
| 5,508,057 A | 4/1996 | Wong et al. |
| 5,518,755 A | 5/1996 | Wong et al. |
| 5,536,524 A | 7/1996 | Miller |
| 5,589,217 A | 12/1996 | Mazurek |
| 5,597,605 A | 1/1997 | Mazurek |
| 5,626,903 A * | 5/1997 | Gautchier et al. .......... 426/611 |
| 5,667,838 A | 9/1997 | Wong et al. |
| 5,693,357 A | 12/1997 | Wong et al. |
| 5,709,209 A | 1/1998 | Friemel et al. |
| 5,714,193 A | 2/1998 | Fix et al. |
| 5,885,645 A | 3/1999 | Wong et al. |
| 5,935,633 A | 8/1999 | Derian |
| 5,942,275 A | 8/1999 | Wong et al. |
| 5,958,913 A | 9/1999 | Miettenen et al. |
| 6,010,737 A | 1/2000 | Meade |
| 6,312,754 B1 | 11/2001 | Wong |
| 2002/0015761 A1 | 2/2002 | Prosise et al. |

OTHER PUBLICATIONS

U.S. patent application Ser. No. 09/813,251, Wong et al., filed Mar. 20, 2001.

U.S. patent application Ser. No. 09/813,254, Wong et al., filed Mar. 20, 2001.

U.S. patent application Ser. No. 09/982,773 Trout et al., filed Oct. 18, 2001.

U.S. patent application Ser. No. 09/982,703 Trout et al., filed Oct. 18, 2001.

U.S. patent application Ser. No. 09/982,004, Heisey et al., filed Oct. 18, 2001.

U.S. patent application Ser. No. 09/982,712, Wong et al., filed Oct. 18, 2001.

* cited by examiner

REDUCED FAT LIPID-BASED FILLINGS

CROSS REFERENCE TO RELATED APPLICATIONS

This application claims the benefit of priority to U.S. Provisional Application Ser. No. 60/242,609, filed Oct. 23, 2000, which is herein incorporated by reference.

TECHNICAL FIELD

The present invention relates to lipid-based fillings. More specifically, it relates to lipid-based fillings that have reduced fat and low moisture and are suitable for use in producing randomly packed food products.

BACKGROUND OF THE INVENTION

Lipid-based fillings are used to produce a variety of food items. For instance, sandwich cookies and crackers are very popular food items in which lipid-based fillings are used. Typically, two identical biscuits (the shells or basecakes) contain a layer of sweet or savory fat lipid-based filling. There are many variations on this basic type. For example, the shells may be dissimilar in shape or color and one shell may have a hole or holes through which the lipid-based filling can be seen. The sandwich may be formed with wafer sheets and have multiple layers of lipid-based filling between the wafers. Lipid-based filling sandwich biscuits may be enrobed with a chocolate or other coating.

The fat component of sandwich cookie and cracker lipid-based fillings affects not only the eating character of the product, but other important aspects of process and quality. The sandwich lipid-based filling should be firm at ambient temperature to maintain product shape and not squeeze out on handling or when bitten, yet have organoleptic properties allowing rapid melting in the mouth to release ingredients giving maximum flavor sensation without greasiness. The sandwich lipid-based filling should adhere to the biscuits so that the basecakes do not become misaligned or smeared, and the product does not fall apart (known as splitting or decapping) in production or after storage.

A number of fats, other ingredients, and processing conditions have been suggested for use in preparing filled biscuit sandwiches. Hydrogenated coconut and palm kernel oils are most used for lipid-based fillings (Manley, D. J. R., Technology of Biscuits, Crackers and Cookies, Ellis Horwood, Ltd., Chichester, 1983, pages 72 to 74). However, these lauric fats exhibit cooling difficulties and have a tendency to supercool. As the supercooling is relieved, the mass sets up making extraction from a bulk store difficult unless the general temperature is considerably higher than 20° C. (ibid.).

Controlled lipid-based filling biscuit cooling and good pressure following topping of the sandwich have been suggested to alleviate the problem (id. at 343 to 344). Either the lipid-based filling should be warmer at depositing or the biscuit shell should be warmer than the lipid-based filling. Where cooling is done, this should be minimal to effect a desired firmness of the lipid-based filling on the hottest day. Cooling air temperatures should be adjusted so that the biscuits are not taken to below the dew point so that condensation does not spoil biscuit shell quality, or adhesion at the biscuit-filling interface. Because of the high cost of operations and plant space for cooling tunnels, many plants do not cool their sandwich cookies and crackers either long enough or low enough (Smith, W. H., Biscuits, Crackers and Cookies, vol. 1, MFI, New York, 1972, pages 332 to 333).

U.S. Pat. No. 4,587,128 to Cummings teaches that a bonding layer be employed to make a snack food product, and that a pressure bearing member in the production equipment press the components into intimate contact with the bonding layer, but this complicates manufacture by adding another component and a pressure bearing member.

U.S. Pat. No. 4,865,859 to Porcello teaches a filling which is soft at room temperature yet is structurally stable during simulated adverse transport condition. The filling comprises a soybean oil-containing oleaginous composition mixed with sugar and preferably a flavoring.

U.S. Pat. No. 4,374,438 to Yost teaches quick-setting fillings suitable for sandwich biscuits. The fillings have a fat component enriched with triglycerides having both long, saturated C16 to C22 fatty acid residues and short C2 to C4 acid residues ("short/long triglycerides").

In Western countries, there is a general trend away from foods that are high in fat and calories, and decreasing dietary fats has been of special interest since fats have a significantly higher caloric density than either carbohydrates or protein. Hence, consumers have increasingly demanded food products with decreased caloric intake from fats.

Accordingly, it would be desirable to provide reduced-fat lipid-based fillings that are suitable for use in producing biscuit sandwiches that remain intact during processing and shipment such that the biscuit sandwiches experience minimal misalignment and decapping, and such that the biscuit sandwiches are suitable for packing randomly in bags. It would be especially desirable to provide such a lipid-based filling that also has desirable organoleptical properties. It would also be desirable to provide a method for making such a sandwich biscuit without the use of special bonding agents or the need for specialized manufacturing equipment. Furthermore, it would be desirable to produce such a reduced-fat lipid-based filling that has a low moisture content, such that the lipid-based filling is shelf-stable.

SUMMARY OF THE INVENTION

The present invention provides reduced-fat, low-moisture lipid-based fillings with desirable organoleptical properties. The lipid-based fillings can be used in a variety of food products, but are particularly suitable for use in producing randomly packed biscuit sandwiches.

The low moisture, reduced fat, lipid-based filling comprises: (a) at least about 20% non-digestible lipid; and (b) from about 0.5% to about 35% crystallizing lipid. The filling can additionally comprise other suitable optional ingredients.

The filling has a water activity of less than about 0.6 and has at least about 20% less digestible fat than a comparable full-fat lipid-based filling.

In one embodiment, the filling is a cheese filling. The low moisture, reduced fat, lipid-based cheese filling comprises:
 (a) from about 20% to about 60% non-digestible lipid;
 (b) from about 0.5% to about 35% crystallizing lipid;
 (c) from about 20% to about 75% dehydrated cheese powder; and
 (d) from about 0% to about 55% bulking agent.

Although not as preferred, in an alternate embodiment, the reduced fat, low moisture, lipid-based filling comprises:
 (a) at least 20% lipid, wherein said lipid comprises:
  (1) from about 20% to about 100% non-digestible lipid; and
  (2) from about 0% to about 80% digestible lipid; and
 (b) from about 0.5% to about 35% crystallizing lipid.

In another alternate embodiment, the filling is a cheese filling comprising:
 (a) at least 20% lipid, wherein said lipid comprises:
  (1) from about 20% to about 100% non-digestible lipid; and
  (2) from about 0% to about 80% digestible lipid;
 (b) from about 0.5% to about 35% crystallizing lipid;
 (c) from about 20% to about 75% dehydrated cheese powder; and
 (d) from about 0% to about 55% bulking agent.

The fillings of the present invention can be used with any suitable substrate; alternatively, the fillings can be used as a stand-alone food item. Preferred substrates include base cakes, which can be used to form sandwich biscuits. The sandwich biscuits remain intact during processing and shipment such as to minimize misaligned, smeared, split, or decapped products. These sandwich biscuits are especially suitable for being packaged randomly into bags. When subjected to the Vibration Test (set forth in the analytical methods section herein), the sandwich biscuits experience less than about 20% separation.

DETAILED DESCRIPTION

A. Definitions

As used herein, "lipid-based filling" includes any filling comprising at least about 20% lipid.

As used herein, "reduced fat" means at least about 20% less digestible fat than a comparable full-fat lipid-based filling.

As used herein, "low moisture" means a water activity of less than about 0.6.

As used herein, "added lipid" refers to lipid which is added over and above that amount inherently present in the other ingredients.

As used herein, the term "lipid" refers to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term. Mixed triglycerides made from medium and long chain saturated and/or unsaturated fatty acids are also included in the term. See, for example, U.S. Pat. No. 5,288,512 to Seiden. Oils that contain medium chain triglycerides can also be used. See, e.g., U.S. Pat. No. 4,863,753 to Hunter et al. Other oils which may be used include a triacylglycerol oil such as liquid Salatrim™ oil (sold under the trade name Benefat™ III by Cultor Food Science, New York, N.Y.).

The term "non-digestible fat" refers to those edible fatty materials that are partially or totally indigestible, e.g., polyol fatty acid polyesters, such as OLEAN™.

While this invention will be generally described in terms of Olestra, it should be readily apparent that other fat substitutes or mixtures thereof could also be utilized in, and are contemplated by, this invention. Mixtures of fats and fat substitutes are also contemplated herein.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils are also included in the term "lipid." Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN™, a preferred non-digestible fat, is made by The Procter and Gamble Company. These preferred non-digestible fat are described in Young; et al., U.S. Pat. No. 5,085,884, issued Feb. 4, 1992, and U.S. Pat. No. 5,422,131, issued Jun. 6, 1995 to Elsen et al.

All percentages are by weight unless otherwise specified.

B. Lipid-Based Filling

As used herein, "lipid-based filling" includes any filling comprising at least about 20% lipid. Preferably, the principal lipid component is a non-digestible fat. The fillings of this invention typically have an added lipid component making up from about 20% to about 40% of the total filling composition. The preferred fillings are of a low moisture content to promote shelf stability. The lipid-based fillings have a water activity (Aw) of less than about 0.6.

The fillings of the present invention also comprise a fully or partially saturated lipid ("crystallizing lipid"), preferably a triglyceride.

The inclusion of a sucrose polyester non-digestible fat allows for a reduced fat, reduced calorie product that has improved mouthfeel and flavor versus other lowfat filled biscuits. In comparison, many lowfat filled biscuits use high levels of polyols, emulsifiers, fillers, or moisture to achieve fat reduction. High moisture contributes to microbial growth, and polyols, emulsifiers, and fillers can contribute calories and limit consistency, mouthfeel, and flavor. The product also resists separation of the base cake from the filling, even under stressful environments such as random packout in vertical form fillers.

Additionally, the filling may comprise additional, optional components.

Fully or Partially Saturated Lipid ("Crystallizing Lipid")

A fully or partially saturated lipid ("crystallizing lipid") is included in the lipid-based filling at a level of from about 0.5% to about 35%, preferably from about 1% to about 10%, and more preferably from about 5% to about 10% to facilitate crystallization and setting of the fillings. The crystallizing lipids are solid at room temperature (70° F.). Without the crystallizing lipid, the product would either be too dry/crumbly or too mushy to maintain proper biscuit alignment. The preferred crystallizing lipid is preferably one which provides for filling stability yet allows for good mouthmelt. Preferred crystallizing lipids include partially or fully hydrogenated vegetable oils, animal fats, solid sucrose polyesters, structured triglycerides, and mixtures thereof.

Most preferred crystallizing lipids are any of the known stabilizers such as, but not limited to, fully or partially hydrogenated rapeseed oil, fully or partially hydrogenated soybean oil, or other fully or partially hydrogenated triglycerides having a high proportion of $C_{18}$, $C_{20}$, or $C_{22}$ fatty acids. (See, for example, U.S. Pat. No. 3,597,230 and U.S. Pat. No. 3,192,102.) These materials can be mixed with a second lipid having an iodine value of less than 8, for example fully or partially hydrogenated palm oil, fully or partially hydrogenated canola oil, fully or partially hydrogenated soybean oil, fully or partially hydrogenated cottonseed oil, fully or partially hydrogenated coconut oil, and similar materials. This stabilizer can also be mixed with lower melting fat fractions such as, for example, the peanut butter stabilizer composition disclosed in U.S. Pat. No. 4,341,814 (1982).

Most other sandwich biscuits achieve adhesion via a triglyceride fat that has a specific melt profile. Usually, the fat contains a high amount of solids below about 80° F. and little to no solids above 100° F. The product is sandwiched from about 70° F. to about 80° F. and the fat is substantially crystalline at that temperature. After sandwiching, the fat stiffens and binds the two base cakes together. Without being limited by theory, it is believed that this is the result of the fat in the filling assuming a beta prime crystal structure. This is presumably not possible if the fat in the filling is comprised mostly of liquid at ambient temperature, or is shear thinning with little or no crystal memory.

It has been found that, without compromising adhesive properties, a sandwich cracker can be made with a filling comprising from about 20% to about 60%, preferably from about 25% to about 40%, most preferably from about 28% to about 33% lipid that is substantially liquid at room temperature or has little or no crystal memory after shearing. In a preferred embodiment, the added lipid is a commercially available sucrose polyester (olestra) such as Olean™. In a temperature range of from about 65° F. to about 130° F., these sucrose polyesters contain about 94% liquid. Above 150° F., it is approximately 100% liquid. Additionally, the 6% solids in the olestra do not form beta prime crystal structures. Upon shearing, it remains thin, even after sitting for several hours. Improved adhesion is achieved by blending a crystallizing lipid into the filling. The product is sandwiched in a temperature range that allows the crystallizing lipid to be fully or partially melted. When the crystallizing lipid stiffens, it then binds the base cakes together when used to make a sandwich biscuit product.

In an alternate embodiment, mixtures of sucrose polyester and one or more other fats is used as the crystallizing lipid component of the lipid-based filling.

Optional Ingredients

The filling can contain other suitable ingredients depending upon the flavor or other properties desired. As used herein, "optional ingredients" refers to one or a mixture of more than one of these other suitable ingredients. Non-limiting examples of suitable optional ingredients are set forth below.

The lipid-based fillings of this invention can contain a flavoring and, in most embodiments, at least one other component in addition to the flavoring and the fat components. For example, sandwich cracker fillers typically contain salt. Sandwich cookie fillers typically contain a sweetener; indeed, in sweet creams, the major ingredients are sweetener and fat. The sweetener can be a natural sweetener such as sugar, primarily sucrose, glucose, fructose, and maltose, or any one of known artificial sweeteners including 1-aspartyl-1-phenylalanine methyl ester (commercially available as aspartame or Nutri-Sweet™), saccharine, cyclamate and the potassium salt of 6-methyl-3,4-dihydro-1,2,3- oxathiazin-4-one-2,2-dioxide (commercially available as acesulfame-K), or a mixture of these.

The filling compositions of the present invention can also contain other ingredients depending upon the flavor or other properties desired. For instance, milk or milk powders or solids (preferably nonfat) can be included, as can eggs, gelatin, cornstarch or other starch such as potato or rice, fruits and nuts, vegetable, cheese and meat pieces, colorings, and lecithin or other emulsifiers. Compositions containing artificial sweeteners substantially sweeter than sucrose typically contain a bulking agent such as polydextrose, isomalt, isomaltulose, polyglucose, polymaltose, carboxymethylcellulose, microcrystalline cellulose, cellulose gel, arabinogalactan, as well as mixtures or combinations of any of these. These agents can be included in amounts readily determinable by the skilled artisan.

An emulsifier can be used in the present invention. The emulsifier can be any food compatible emulsifier such as mono- and di-glycerides, lecithin, sucrose monoesters, polyglycerol esters ("PGE"), sorbitan esters, polyethoxylated glycerols, and mixtures thereof. Typically, up to about 3%, preferably from about 1% to about 3%, stabilizer or emulsifier can be used.

The filling compositions can also optionally comprise flavorants. "Flavorants," as the term is used herein, are agents which contribute to or enhance the flavor of the nut butter. These include sweeteners, flavor enhancers, artificial sweeteners, natural and artificial flavors, flavored or candied bits, nut chunks and other additives which contribute to the flavor of the filling. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener will be something which has a sweetness intensity about that of sucrose or fructose. Sweeteners can be added at a level of about 5% to about 20%, preferably from about 7% to about 12%.

Artificial sweeteners such as aspartame, acesulfam, saccharine, cyclamate, and glycyrrhizin can also be used. The amount of artificial sweetener used should be that amount effective to produce the sweetness that is desired, and would be about the equivalent of the addition of from about 1% to about 7% of sucrose.

Flavor enhancers including salt, or salt substitutes such as potassium chloride, sodium chloride/potassium chloride mixtures, and seasoned salts can also be used. The level of flavor enhancer used is a matter of the desired taste level, but usually is from about 0.1% to about 2%. Other flavorants include natural or artificial flavors, roasted flavors, and praline/caramel flavors, walnut flavors, almond flavors, and flavor compositions.

The present invention can also employ nut chunks and other flavored additives which can be mixed with the filling. These additives include chocolate chips or bits or other flavored bits (e.g., butterscotch and peanuts), jellies (either low calorie jellies or regular jelly or preserves), and praline nuts or other candies. These additives are usually added at a level of from about 1% to about 20% by weight. Nut chunks and flavored bits can contain fats and oils. Thus, the addition of these materials can affect the fat content and the calorie level of the nut spread.

A bulking agent can be included in filling composition. Bulking agents typically add body or texture to the filling and can be non-nutritive or low calorie materials. Suitable bulking agents include hydrolyzed starch (e.g., corn syrup solids or maltodextrin), dextrose, polydextrose, mono- and disaccharides, starches (e.g., corn, potato, tapioca wheat), as well as mixtures thereof. Corn syrup solids, polydextrose (such as that available from Pfizer Chemicals) and maltodextrin are preferred bulking agents. Sugar substitutes which function like sugars but which are non-nutritive can also be used. Such sugar substitutes include the 5-C-hydroxyalkylaldohexoses described in U.S. Pat. No. 5,041,541, issued Aug. 20, 1991 to Mazur.

The filling can also be fortified with vitamins and/or minerals. These can include, but are not limited to, Vitamin A, Vitamin D, Vitamin K, Vitamin C, Vitamin E, thiamin, riboflavin, niacin, Vitamin B-6, Vitamin B-12, biotin, pantothenic acid, iron, calcium, niacin, magnesium, and mixtures thereof.

Sterols or sterol esters can also be incorporated into the filling of the present invention. Suitable sterol and sterol ester compositions are described in U.S. Pat. No. 3,751,569, issued Aug. 7, 1973 to Erickson; U.S. Pat. No. 5,244,887, issued Sep. 14, 1993 to Straub; U.S. Pat. No. 3,865,939 issued Feb. 11, 1975 to Jandacek et al.; U.S. Pat. No. 3,085,939, issued Apr. 16, 1963 to Wruble; U.S. Pat. No. 5,502,045, issued Mar. 26, 1996 to Miettinen; U.S. Pat. No. 5,958,913, issued Sep. 28, 1999 to Miettinen; and in co-pending P&G Application 8003P, filed Mar. 27, 2000.

C. Cheese Filling

A preferred filling of the present invention is a cheese filling comprising from about 20% to about 60%, preferably from about 25% to about 40%, and most preferably from about 28% to about 33%, non-digestible lipid; and from about 0.5% to about 35%, preferably from about 1% to about 10%, and more preferably from about 5% to about 10% crystallizing lipid; and from about 20% to about 75%, preferably from about 40% to about 60%, and most preferably from about 45% to about 55%, dehydrated cheese powder; and from about 0% to about 55%, preferably from about 5% to about 20%, and most preferably from about 10% to about 15% bulking agent.

The preferred cheese filling is reduced in fat and has a low moisture content.

Dehydrated Cheese Powder

Any dehydrated cheese powder suitable for producing an instant cheese, such as those disclosed in U.S. Pat. No. 5,935,633, issued Aug. 10, 1999 to Derian, can be used to make the preferred cheese filling of the present invention. The dehydrated cheese powders generally have less than about 3.5% of moisture.

Dehydrated cheese powders which may be employed in the instant cheese compositions of the present invention include, but are not limited to, Anejo Enchilado Cheese Powder 73870, Monterey Jack Cheese Powder 9497, Mozzarella Zing Cheese Powder 9498, Swiss Zing Cheese Powder 9481, Cotija Cheese Powder 73401, Parmtang Cheese Powder 9335, Romano Tang Cheese Powder 9381, Sharpee for Baking Cheese Powder 9510, Panela Cheese Powder 73397, Hexagon Cheese Powder 9483, Cotija with Jalapeno Cheese Powder 73857 and Cuatro Queso Cheese Powder 73856. Especially preferred is Cheez Zing.

The cheese powders and numbers described above are the commercial names for cheese powders made by Kraft Food Ingredients, a division of Kraft Foods, Inc.

A single dehydrated cheese powder or a mixture of more than one cheese powder may be used as the dehydrated cheese powder in the cheese filling compositions of the present invention.

Bulking Agent

A bulking agent can be included in the cheese filling composition. Bulking agents typically add body or texture to the filling and can be non-nutritive or low calorie materials. Suitable bulking agents include hydrolyzed starch (e.g., corn syrup solids or maltodextrin), dextrose, polydextrose, mono- and disaccharides, starches (e.g., corn, potato, tapioca wheat), as well as mixtures thereof. Corn syrup solids, polydextrose (such as that available from Pfizer Chemicals) and maltodextrin are preferred bulking agents. Sugar substitutes which function like sugars but which are non-nutritive can also be used. Such sugar substitutes include the 5-C-hydroxyalkylaldohexoses described in U.S. Pat. No. 5,041,541, issued Aug. 20, 1991 to Mazur.

The preferred bulking agent is hydrolyzed starch. The preferred hydrolyzed starches include maltodextrins and corn syrup solids. The preferred hydrolyzed starches have Dextrose Equivalent (D.E.) values of from about 5 to about 30, preferably from about 10 to about 20. Maltrin™ M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the higher the dextrose equivalence of the starch.

Process for Making Cheese Filling

The dry ingredients are first blended in a suitable mixer, such as a ribbon blender. The non-digestible lipid and the crystallizing lipid are both melted (together or separately) and then are combined with the dry ingredients. Mixing is continued until the lipid is homogeneously blended with the dry ingredients.

D. Substrate

Although the present invention is generally described herein in terms of a lipid-based filling suitable for use in combination with a substrate, it should be understood that the lipid-based filling can also be used as a stand-alone food item. For example, the lipid-based filling can be consumed without being employed as part of another food item. It is fully contemplated that the lipid-based filling can be separately packaged for later consumption or use, such as in a pressurized container, a bowl, a tub, a jar, or any other suitable container. Furthermore, the lipid-based filling can be used for any other appropriate uses such as a topping or a spread. For instance, it can be spread on a cracker or toast points and used as an hors d'oeuvre.

The filling of the present invention can be utilized with any suitable substrate. For example, the fillings of this invention can be employed in a variety of food products, including bakery, dessert, snack, candy, dairy, nut, meat, egg, and vegetable products. The fillings are especially adapted to all types of bakery products including leavened baked products, both yeast raised and chemically leavened, and unleavened baked products. Bakery products include cakes, breads, rolls, pastries, cookies, biscuits, and savory crackers. Other suitable food products include jelly rolls, pirouettes, wafers, and hollow snack foods. For example, the filling of the present invention can be used in snack foods such as tortilla sandwiches or potato crisp sandwiches, comprising two chips which sandwich a filling.

Preferred substrates for use herein include base cakes such as crackers, cookies, and biscuits; these can be used with the filling of the present invention to form sandwich biscuits. (As used herein, the term "sandwich biscuits" is broad enough to include sandwich cookies, sandwich crackers, and the like.) Any suitable base cake can be used for making the sandwich biscuits of the present invention. Preferably, the base cake is prepared using non-digestible fat and is low in fat and calories.

The preparation of a preferred sandwich biscuit is described below.

E. Sandwich Biscuit

For sandwich biscuits, the fillings are formulated, mixed, and optionally aerated before applying to the shell or basecake by stencilling, depositing, extruding, or other means known to the skilled artisan. The basecake and filler combination is then capped with another basecake.

The filling is applied at a temperature of from about 50° F. to about 160° F., preferably from about 70° F. to about 125° F. If the filling is too warm, it will be thin and will flow out of the sandwich when the top base cake is applied. If it is too cool, the crystallizing lipid may already be crystallized and adhesion will not occur. The exact temperature range used depends on the crystallizing lipid being used. The higher melting the fat, the warmer the application will have to be.

The filling should be applied quickly after mixing (i.e. up to 4 hours, preferably less than 2 hours, most preferably less than 1 hour) unless it can be kept above the complete melt point of the crystallizing lipid. Waiting too long at a temperature below the complete melt point will allow the fat to begin to crystallize and reduce the adhesive properties.

F. Physical Properties

The fillings and filled products of this invention exhibit a number of desirable characteristics. The fillings of this invention exhibit good adherence, holding the top and bottom basecakes together well. Misalignment and decapping in the production of biscuit sandwiches can be minimized by using the fillings of this invention without resorting to extra bonding layers or special pressure and/or cooling equipment.

When subjected to the Vibration Test (described in the analytical methods section herein), separation of the sandwich biscuits is less than about 20%, preferably less than about 10%, and more preferably less than about 5%.

G. Alternate Embodiment

Although not as preferred, in an alternate embodiment, the reduced fat, low moisture, lipid-based filling comprises:

(a) at least 20% lipid, wherein said lipid comprises:
 (1) from about 20% to about 100% non-digestible lipid; and
 (2) from about 0% to about 80% digestible lipid; and
(b) from about 0.5% to about 35% crystallizing lipid.

In one embodiment, the filling is a cheese filling comprising:

(a) at least 20% lipid, wherein said lipid comprises:
 (1) from about 20% to about 100% non-digestible lipid; and
 (2) from about 0% to about 80% digestible lipid;
(b) from about 0.5% to about 35% crystallizing lipid;
(c) from about 20% to about 75% dehydrated cheese powder; and
(d) from about 0% to about 55% bulking agent.

ANALYTICAL METHODS

Parameters used to characterize elements of the present invention are quantified by particular analytical methods. These methods are described in detail as follows. (All laboratory instruments should be operated according to manufacturers' instructions, as set forth in the instrument operation manuals and/or other instructional materials, unless otherwise indicated.)

1. Fat Content

The method used to measure total fat content (both digestible and non-digestible) herein is AOAC 935.39 (1997).

Digestible Fat Content

Digestible lipid (NLEA) method AOAC PVM 4:1995 is used to determine the digestible fat content.

Non-Digestible Fat Content

Non-Digestible Fat Content=Total Fat Content−Digestible Fat Content

Olestra-Containing Foods—Digestible Fat and Saturated Fat: The content of total digestible fat and total digestible saturated fat of a food is measured according to the published AOAC peer-verified method for quantifying fat in olestra-containing snack foods (AOAC Peer-Verified Method PVM 4:1995, "Capillary Gas Chromatographic Determination of Fat in Olestra Savory Snack Products", AOAC International, Gaithersburg, Md.).

2. Moisture Content

The moisture content can be determined by a forced air oven volatiles method as follows:

Equipment

Forced air oven, aluminum tins with lids, Cabinet-type desiccator

Procedure

1. Weigh tin and lid to 0.0001 grams and record weight as tare weight
2. Place 2–3 gram ground sample into tin, weigh to 0.0001 grams and record as gross weight
3. Set oven temperature to 105° C.
4. Place tin containing the sample in oven for 1 hour, uncovered
5. Remove tin containing the sample from the oven, cover the tin, and place in desiccator until cooled to room temperature
6. Weigh tin, lid and dried sample to 0.0001 grams and record as final dried weight Calculations 1. Sample weight=gross wt.−tare wt.
2. Final weight=weight recorded in step 6
3. Moisture Content (%)=[(gross wt−final wt.)/sample wt]×100.

3. Water Activity (Aw)

The water activity is defined as the ratio $A_w=p/p_o$, where p represents the actual partial pressure of water vapor and $p_o$ the maximum possible water vapor pressure of pure water (saturation pressure) at the same temperature. The $A_w$ level is therefore dimensionless; pure water has a level of 1.0, and a completely water-free substance has a level of 0.0. The relationship between the equilibrium relative humidity ERH in a food and the water activity is $A_w X100=ERH$.

Instrument

Conductivity humidity meter Rotronic Hygroskop DT (model WA-40 TH) with an operational temperature range from 0 to 100C., and 0 to 100% RH.

Method

1. Weigh~5 grams of the sample and transfer it into a plastic bag.
2. Break the sample into small pieces with a flat object.
3. The samples to be measured are placed in small polysterene dishes in the bottom half of the measuring station.
4. Maintain the temperature constant by setting the equipment in a constant room temperature, or by using a water bath connected to the cells.
5. Wait until the reading of Aw does not change anymore (reading is stable). A red light from the panel will indicate that the instrument is still reading a decrease or increase in value for Aw.
6. Remove the dish with the sample from the chamber and measure moisture content.

4. Vibration Test

An MTS 840.03E Vibration Test System simulates rough handling of sandwich crackers and is used to analyze the adhesion properties of sandwich crackers. MTS Systems Corporation in Minneapolis, Minn. manufactured this particular unit in 1983.

First, 184 to 190 grams (6.5 ounces) of sandwich crackers are randomly placed into a bag. The bag is 6.375" by 10.000" and is presealed at the bottom. The outer surface of the bag is 100 gauge oriented polypropylene. Sixty gauge metalized polyester comprises the inner layer. A layer of polyurethane-based adhesive resides in the middle of the two layers and binds them together. Five bags of Ritz Bits sandwich crackers are filled. For cheese flavor, the Ritz Bits used are code 1040AX13 or equivalent. Peanut flavored Ritz Bits are code 1050AX23 or equivalent. Five bags of test sandwiches are also filled. The open end of the bags is then heat sealed.

These ten bags are then placed into cartons. The cartons are 6.125" by 1.875" by 8.000" (L×W×H) and are made of paperboard. The top and bottom flaps are sealed with RESYN® adhesive from National Starch and Chemical Company. RESYN® is a formulated copolymer emulsion adhesive and secures the flaps. The bags are placed into the cartons and the flaps are secured.

The cartons are placed into a cardboard box that is 9.500" by 12.375" by 8.125" (L×W×H). These dimensions allow for the cartons to be arranged in a 5 by 2 matrix. An alternating pattern of Ritz Bits and test cartons eliminates the uncertainty caused by the position within the box.

The box is closed and secured with packing tape. The shipping box is placed on the vibration table and restrained so it can not move horizontally. The box vibrates with an acceleration of 1.25 g (12.3 m/s²) at 4.5 Hz. After exactly 8,100 vibrations, the table stops and the individual cartons are carefully opened and counted.

A separated cracker is defined as one in which the base cakes are no longer attached to each other. The separation can occur between the base cake and filling, in the middle of the filling, or a combination of both. A cracker which has separated into two or more pieces counts as only one separated cracker. The number of total crackers is the number of sandwich crackers which were originally packed into the bags. The data is used to calculated the % separated crackers as shown below.

% Separated Crackers=(Number of Separated Crackers*100)/(Number of Total Crackers)

The result is reported as an average of the five test cartons versus the average of the five Ritz Bits cartons.

EXAMPLES

The following examples are illustrative of the present invention but are not meant to be limiting thereof.

Example 1

Sandwich crackers made with a reduced fat filling are prepared as follows:

Base Cake Formulation

| Ingredient | % |
| --- | --- |
| 62DE Corn Syrup (Quality Ingredients Corp., Chester, N.J.) | 2.00 |
| Olean ® (Procter & Gamble Co., Cincinnati, OH.) | 12.37 |
| Hot water | 8.61 |

-continued

| Ingredient | % |
|---|---|
| enzyme tabs | 1 tab |
| L-Cysteine HCl Monohydrate (Quality Ingredients Corp., Chester N.J.) | 0.05 |
| Granulated Sugar (Holly Sugar Co., Worland, WY.) | 6.02 |
| Salt-TFC Purex (Morton International, Inc., Philadelphia, PA.) | 0.32 |
| Flour-soft wheat (Siemer Milling Co., Teutopolis, IL.) | 62.94 |
| Sodium Bicarbonate (Church & Dwight Co., Princeton, NJ.) | 1.34 |
| Calcium Phosphate Monobasic (Regent 12XX, Rhodia, Cranbury, N.J.) | 0.54 |
| Sodium Aluminum Phosphate (Levair, Rhodia, Cranbury, N.J.) | 0.54 |
| Ammonium Bicarbonate (Church & Dwight Co., Princeton, NJ.) | 2.69 |
| Cold water | 2.58 |

Base Cake Making
Dough Making
1. Corn syrup, Olean, hot water (160° F.), L-cysteine and enzyme tablets dissolved in water are weighed into a mixer (APV 100# single blade horizontal mixer) and then mixed for 30 seconds @38 rpm.
2. Next, sugar and salt are weighed into the mixer and then mixed for 2 minutes @38 rpm.
3. Then the remaining dry ingredients (flour, sodium bicarbonate, and non-ammonia leavening salts) are weighed into mixer and mixed for 3 minutes at 45 rpm.
4. Then ammonium bicarbonate, dissolved in cool water, is added and mixed for one minute @60 rpm.
5. The resulting dough is emptied into a stainless steel tram, covered with plastic sheet, and allowed to "rest" at room temperature for 30 minutes.

Dough Forming
1. Dough is fed through a three-roll mill (Two initial corrugated roll diameters=16.5", and one smooth roll diameter=11.8") and sheeted to 0.25". The take-off belt speed exiting the three-roll mill is 2.0 fpm, and is matched to the speed of the dough sheet as it exits the three roll mill.
2. The sheet is sent through a calender roll #1 (a 11.8"dIA. two-roll mill), and sheeted to ~0.10". The take-off belt speed exiting the calender roll #1 is 4.4 fpm, and is matched to the speed of the dough sheet as it exits the calender roll #1.
3. As the sheet came through calender roll #1, it is folded over eight times at a width of ~10" to form a bundle of laminated dough. The bundle is covered with plastic film to prevent dehydration and briefly set aside while additional bundles are collected.
4. The laminated sheet of 3 above is sent through the two-roll mill #1 again to form 0.10" sheet.
5. The sheet continued on calender roll #2 to form a finished dough sheet of (~0.08") thickness. The take-off belt speed exiting the calender roll #2 is 7.9 fpm, and is matched to the speed of the dough sheet as it exits the calender roll #2.
6. The dough sheet is then passed under a cutter die roll to form crackers of approximately 1.1 inch by 1.1 inch square. The belt speed is 7.7 fpm. The 3.875" diameter cutter roll can be designed to cut a variety of shapes. The shape used in this example contains docking holes. The roll is obtained from Weidenmiller Co. (Itasca, Ill.). The function of the docking pins is thought to join the dough layers together and create venting during baking.
7. After separating the web (the portion of the sheet left over after the shapes are cut out), the crackers are salted using a roller-salter or equivalent. The web may be recycled back to the dough awaiting introduction into the three-roll mill.
8. The cracker dough forms are then sprayed with a water mist (flow rate=65–212 g/mIN.) before baking. This helped attain a lighter color after baking.

Baking
1. The cracker dough forms are transferred as a continuous feed from the dough forming belt onto the oven band such that their relative spacing is undisturbed (a slight speed differential is permissible if it is desired to place the cracker dough forms closer, or further apart on the oven band prior to baking). The oven band is made of metal of the open weave versus solid surface type. Solid surface metal oven bands may also be used for certain applications.
2. The cracker dough forms are baked in an APV 45 foot long three-zone indirect-fired oven. Each zone had independent top and bottom heat applied. Dampers and temperatures in each zone are set at the following conditions:
   $1^{st}$ zone top: 465° F., bottom: 500° F., damper closed
   $2^{nd}$ zone top: 480, bottom: 520, damper ½
   $3^{rd}$ zone top: 355, bottom: 425, damper open
Oven band speed (fpm): 13
Final moisture contents are about 0–4%.

Post Baking
1. As hot baked crackers exits the oven, they are sprayed with hot oil or Olean® (~160° F.) to a level of about 10% their post baked weight. The crackers are passed under heat lamps for ~15 seconds to aid in absorption of oil.
2. The crackers are then passed through a cooling tunnel at room temperature. Olean® containing products must cool through the temperature range of 130° F.–140° F. in about 10 minutes to ensure the proper crystalline structure.

Reduced Fat Lipid Based Filling Formulation

| Ingredient | % |
|---|---|
| Olestra (Procter and Gamble, Cincinnati, OH) | 31.8 |
| Part. hydrog. soy oil (Kaomel flakes & KLX flakes, Loders Croklan) | 8.0 |
| American cheese powder (Kraft Food Ingredients, Memphis, TN) | 42.8 |
| Cheddar cheese powder (Kraft Food Ingredients, Memphis, TN) | 4.3 |
| Corn syrup solids (Cargill Company) | 12.9 |
| Vitamin ADK (BASF) | 0.2 |

Reduced Fat Lipid Based Filling Making
1. The cheese powder, corn syrup solids, and vitamin are weighed together and blended in a Hobart (model A-200) mixer for 3 minutes at speed setting #3.
2. Next, the Olean®, kaomel flakes, and KLX flakes are weighed and then mixed together in a container.
3. The Olean®/kaomel/KLX flake mixture is melted by heating until the temperature reaches 159–162F. For lab scale, can be accomplished on a hot plate.
4. The melted fat blend is added slowly to the dry mix from step 1 above while the Hobart is mixing on speed #3. Mixing is continued for 4 minutes at speed #3.
5. The mixture is cooled through the temperature range of 130° F.–140° F. in less than about 10 minutes to ensure the proper crystallizing structure. This can usually be accomplished by ambient cooling for lab batch sizes.
6. The resulting filling is used immediately to prepare sandwich crackers.

Preparation of Sandwich Crackers
1. 1.4–1.6 grams of cheese filling prepared above is applied to the bottom side of a base cake prepared above. For small quantities, the filling is applied via a spatula in the lab. For pilot scale quantities, the filling is dosed into 1.5 gram portions via a Rheon extruder (model #KN170)

which are placed onto the base cake. In either case, the filling is applied to the base cake at a temperature of about 80 F. It is applied within 1 hour from the time the molten lipid is mixed with the dry filling ingredients.

3. The top base cake is then applied with enough pressure so that the filling flows out to meet the edge of the base cake.
4. Steps 1 and 2 are repeated for the desired number of sandwich crackers.
5. The sandwiches are placed on a tray, covered with a plastic bag, and allowed to sit, undisturbed for 12 hours.

Vibration Testing

Sandwich crackers made according to the above procedure were weighed, packed into foil bags, placed into boxes, and vibrated according to the Vibration Test described above. Ritz Bits cheese sandwich crackers (code 1040AX14) obtained from a local grocery were also weighed, packed, and subjected to the same vibration test. The result was 12% separation for the Ritz Bits cheese sandwich crackers, and 0.9% for the sandwich crackers made according the above procedures.

Example 2
Reduced Fat Lipid Based Filling Formulation

| Ingredient | % |
| --- | --- |
| Defatted Peanut Flour (Golden Peanut, Blakely, GA) | 34.9 |
| Olestra (Procter and Gamble, Cincinnati, OH) | 30.9 |
| Peanut Chunks (Procter and Gamble, Cincinnati, OH) | 19.0 |
| Sugar, Powdered 12X (Tate Lyle, Baltimore, MD) | 9.0 |
| Hydrogenated High Erucic Acid Rapeseed Oil (ADM, Decatur, IL) | 2.5 |
| Peanut Paste (Procter and Gamble, Cincinnati, OH) | 2.0 |
| Salt (Morton Salt, Chicago, IL) | 1.5 |
| ADK Vitamin Powder (BASF, Wyandotte, MI) | 0.2 |

Reduced Fat Lipid Based Filling Making
1. A Hobart mixer, model C-100, is preheated and maintained at 150° F. with a custom water jacket.
2. The Olean® is weighed and added to the mixer. It is melted while mixing at speed setting #1.
3. The remaining ingredients are weighed.
4. Sugar and salt are added together to the Olean® and mixed for 5 minutes at speed #1.
5. The peanut flour is slowly added to the Hobart mixer and mixing continues at speed #1 for 15 minutes.
6. Next, the peanut paste is added and mixed for 10 minutes at speed #1.
7. The hydrogenated rapeseed oil is melted in a small beaker using a microwave.
8. The oil is then added to the mixture and mixed for 10 minutes at speed #1.
9. Vitamin powder was added next and also mixed for 10 minutes at setting #1.
10. Finally, the peanut chunks were slowly added to the mixture and allowed to mix for 10 minutes at speed #1.
11. The resulting filling is transferred to a storage container for future use.

Preparation of Sandwich Crackers
1. The peanut filling prepared above is heated to 150° F. in a covered stainless steel pot using a water bath. The filling is stirred occasionally.
2. Once the temperature is attained, the filling is removed from the water bath and allowed to cool. It must be cooled through the temperature range 130° F.–140° F. in less than about 10 minutes to ensure the proper crystallizing structure. This can usually be accomplished by ambient cooling for lab and pilot scale quantities.
3. 1.4 to 1.6 grams of peanut filling is applied to the bottom side of a base cake prepared in example 1. For small quantities, the filling is applied via a spatula in the lab. For pilot scale quantities, the filling is dosed into 1.5 gram portions via an Oden Pro/Fill 3000. In either case, the filling is applied to the base cake at a temperature of about 120° F. It is applied within 1 hour of the temperature dipping below 150° F.
4. The top base cake is then applied with enough pressure so that the filling flows out to meet the edge of the base cake.
5. Steps 3 and 4 are repeated for the desired number of sandwich crackers.
6. The sandwiches are placed on a tray, covered with a plastic bag and allowed to sit, undisturbed for 12 hours.

Vibration Testing

Sandwich crackers made according to the above procedure were weighed, packed into foil bags, placed into boxes and vibrated according to the Vibration Test described above. Ritz Bits peanut butter sandwich crackers (code 0350AX13) obtained from a local grocery store were also weighed, packed, and subjected to the same vibration test. The result was 1.0% separation for the Ritz Bits peanut butter sandwiches, compared with 0.0% for the sandwich crackers made according to the above procedures.

Incorporation by Reference

All of the aforementioned patents, publications, and other references are herein incorporated by reference in their entirety.

Also incorporated herein by reference are P&G Provisional Applications 8303P ("Low Moisture, Reduced Fat, Lipid-Based Fillings," Trout et al.), 8304P ("Reduced Saturated Fat Lipid-Based Fillings," Trout et al.), 8305P ("Filled Snacks," Heisey et al.), and 8306P ("Low Fat Nut Spread Composition and Process for Making the Same," Wong et al.), all filed Oct. 23, 2000.

What is claimed:
1. A low moisture, reduced fat, lipid-based cheese filling comprising:
   (a) from about 20% to about 60% non-digestible lipid;
   (b) from about 0.5% to about 35% crystallizing lipid;
   (c) from about 20% to about 75% dehydrated cheese powder; and
   (d) from about 0% to about 55% bulking agent;
wherein said filling has a water activity of less than about 0.6.

2. A sandwich biscuit comprising:
   (a) the livid-based filling of claim 1;
   (b) a top base cake; and
   (c) a bottom base cake;
wherein said sandwich biscuit has a Vibration Test score of less than about 20% separation.

3. A low moisture, reduced fat, lipid-based cheese filling comprising:
   (a) at least 20% lipid, wherein said lipid comprises:
      (1) from about 20% to about 100% non-digestible lipid; and
      (2) from about 0% to about 80% digestible lipid;
   (b) from about 0.5% to about 35% crystallizing lipid;
   (c) from about 20% to about 75% dehydrated cheese powder; and
   (d) from about 0% to about 55% bulking agent.

4. A sandwich biscuit comprising:
   (a) the lipid-based filling of claim 3;
   (b) a top base cake; and
   (c) a bottom base cake;
wherein said sandwich biscuit has a Vibration Test score of less than about 20% separation.

* * * * *